United States Patent
Karpenko

(10) Patent No.: US 10,808,747 B2
(45) Date of Patent: Oct. 20, 2020

(54) FRICTIONALLY DAMPED FASTENERS AND METHODS OF MANUFACTURING THE SAME

(71) Applicant: Ford Global Technologies, LLC, Dearborn, MI (US)

(72) Inventor: Yuri Anatoly Karpenko, Brighton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 310 days.

(21) Appl. No.: 15/851,979

(22) Filed: Dec. 22, 2017

(65) Prior Publication Data
US 2019/0195264 A1    Jun. 27, 2019

(51) Int. Cl.
| | |
|---|---|
| *F16B 33/00* | (2006.01) |
| *F16B 5/02* | (2006.01) |
| *B21H 3/02* | (2006.01) |
| *F16F 7/08* | (2006.01) |

(52) U.S. Cl.
CPC ............ *F16B 33/00* (2013.01); *B21H 3/02* (2013.01); *F16B 5/0241* (2013.01); *F16F 7/08* (2013.01); *F16F 2222/04* (2013.01); *F16F 2226/04* (2013.01)

(58) Field of Classification Search
CPC . F16B 5/0241; F16B 33/00; F16F 7/08; F16F 2222/04; F16F 2226/04; B21H 3/02
USPC .......................... 411/411, 424, 900, 901, 902
See application file for complete search history.

(56) References Cited

U.S. PATENT DOCUMENTS

| 293,218 | A | * | 2/1884 | Berry | ..................... B62C 5/00 |
| | | | | | 278/61 |
| 2,314,898 | A | * | 3/1943 | Purinton | ................. A44B 1/30 |
| | | | | | 24/101 R |
| 3,704,877 | A | * | 12/1972 | Nunes | .................... B29C 70/14 |
| | | | | | 267/166 |
| 4,296,839 | A | | 10/1981 | Peller et al. | |
| 5,292,215 | A | * | 3/1994 | Roberts, III | ......... F16B 33/006 |
| | | | | | 411/383 |

(Continued)

FOREIGN PATENT DOCUMENTS

| CN | 201582277 | 9/2010 |
| CN | 202418180 | 9/2012 |

(Continued)

*Primary Examiner* — Roberta S Delisle

(57) ABSTRACT

A method and system for increasing damping capacity in a mechanical fastener by utilizing dry friction between individual wires of a sheathed rope is disclosed. For metal fasteners, the sheathed rope is inserted loosely into a thick-walled metal tube. The tube is then rolled to reduce the tube diameter, thereby uniformly embedding the rope into the tube material. The tube is then subjected to either cold or hot forming. After forming, the fastener blank may be threaded. For composite or plastic fasteners, the sheathed rope includes insert locators attached to the sheathing. The sheathed rope having the insert locators is placed in the mold cavity prior to the polymerizable material being injected into the mold. Regardless of the embodiment, the resulting fastener has increased damping due to the dry inter-wire friction within the embedded rope which develops between the surfaces of individual wires upon dynamic loading of a fastened joint.

20 Claims, 14 Drawing Sheets

(56) References Cited

U.S. PATENT DOCUMENTS

| | | | | |
|---|---|---|---|---|
| 7,896,599 B2* | 3/2011 | Stephen | ............... | F16B 33/006 411/377 |
| 8,465,241 B2* | 6/2013 | Gaw | .................... | B29C 70/083 411/424 |
| 9,316,244 B2* | 4/2016 | Jeong | .................... | B29C 70/083 |
| 10,352,394 B2* | 7/2019 | Karpenko | ............... | F16F 13/04 |
| 2014/0271035 A1* | 9/2014 | Wang | .................... | F16B 33/006 411/424 |
| 2016/0341269 A1 | 11/2016 | Karpenko et al. | | |
| 2018/0274624 A1* | 9/2018 | Karpenko | ............... | F16F 13/04 |

FOREIGN PATENT DOCUMENTS

| | | |
|---|---|---|
| CN | 203297264 | 11/2013 |
| JP | 6129576 | 5/2017 |

\* cited by examiner

FRICTIONALLY DAMPED FASTENERS AND METHODS OF MANUFACTURING THE SAME

TECHNICAL FIELD

The disclosed inventive concept relates to assembly components having increased damping capacity. More particularly, the disclosed inventive concept relates frictionally damped fasteners and methods for manufacturing the fasteners. Damping capacity is increased by providing sheathed, vibration-damping cables or ropes comprising plural individual wires that are either linear or twisted relative to one another and are embedded into the fastener during manufacturing.

BACKGROUND OF THE INVENTION

The non-permanent joining of two or more engineering parts is frequently accomplished by a fastener which applies a clamping force to the parts. It is estimated that more than 200 billion fasteners of all types are used per year in manufacturing in the United States with over 10% of that usage being in the automotive industry. Other industries that are significant consumers of mechanical fasteners include the aircraft, appliance, agricultural, and construction industries. Examples of fasteners include bolts such as hex bolts, lag bolts, and carriage bolts, and screws such as wood screws, sheet metal screws, machine screws and socket screws.

The clamping force of a mechanical fastener must be high enough to prevent the joint from loosening in service due to vibration, thermal cycles, or other in-service conditions. At the same time, a clamping force that is too great could cause excessive stress in fasteners and joint members, thereby risking damaged parts and the promotion of stress-corrosion cracking or fatigue failure.

The clamp force is created as a fastener is tightened which forces it to stretch. In a sense, a mechanical fastener works like a spring. Upon being stretched, a spring tries to return to its original size. The force of spring stretching is referred to as tension while the force pulling the spring back to its original size is referred to as compression. As applied to a mechanical fastener, the stretching force is also referred to as tension and it is this tension that creates the clamping force, or that force which holds the clamped parts together.

Most of the materials that are currently used to produce fasteners, e.g., steel (stainless steel, carbon steel and alloy steel), composites, plastics, and the like exhibit very low damping capacity and, thus, the decay of vibration amplitude is very slow. While this does not impact the fastened joints that experience mostly static loading, the dynamically loaded fasteners are in a different situation. Under resonant conditions, the lack of damping in the fasteners can cause a significant increase in the overall joint vibration amplitude yielding to joint failures such as loosening or cracking due to fatigue.

The traditional way to improve vibration resistance of a fastened joint is to transfer the joint clamping force to the connected parts via stacked non-flat washers that can either offer increased grip capacity (e.g., Nord-Lock washers with interlocking features on their working surfaces) or dissipate vibration energy due to friction between their surfaces (e.g., Belleville washers which are conical shells that can be loaded along their axis). While providing certain solutions, the use of additional fastener components for adding damping into the joint structure is not always feasible when there are packaging constraints for the fasteners dimensions, such as location and spacing. Thus, it is highly desirable to increase the damping capacity of a fastener without the need to adjust its overall shape and dimensions.

In view of the state of the art, it may be advantageous to provide mechanical fasteners with appropriate cast-in components that aid in damping without increasing the overall size of the fastener. As in so many areas of manufacturing technology, there is always room for improvement related to mechanical fasteners.

SUMMARY OF THE INVENTION

The disclosed inventive concept provides a method and system for increasing damping capacity in a cold formed fastener, a hot formed fastener, or a molded fastener by utilizing dry friction between individual wires of a rope wrapped in a thin metal layer or sheath. In general, in the case of cold or hot forming, a sheathed, vibration-damping metal cable or rope is placed inside of a metal tube and the fastener is thereafter formed. In the case of molding, a sheathed, vibration-damping metal rope having insert locators is placed in a mold prior to the introduction of the polymerizable material into the mold.

Accordingly, the present invention describes fasteners with enhanced internal damping properties and methods to manufacture them. Such fasteners can improve integrity and durability of a fastened joint in service under vibration loading. The damping improvement is achieved by embedding one or a plurality of sheathed bundles of woven metal wires (wire ropes or cables) inside the fastener body during its body forming process. The resulting fastener has increased damping due to the dry inter-wire friction within the embedded cables which develops between the surfaces of individual wires upon dynamic loading of a fastened joint. The type of the fastener forming process depends on the fastener material that is selected for an application.

When using metallic materials, fasteners can be made using machining and cold or hot forming (e.g., pressure forging, rolling and extruding) processes. In any case, the process of making vibration-damping metallic fasteners starts with collectively wrapping an individual metal rope or a bundle of metal ropes in a thin metal sheath that fully encompasses all of the wires. Sheathing of the cables ensures that the individual wires are free to move and increase damping capacity.

Then, the sheathed, vibration-damping metal rope is placed inside a long thick-walled metal tube where the tube inner diameter is just large enough to allow for the unconstrained insertion of the sheathed metal rope. The next step in forming the body of the fastener depends on its overall length and diameter as well as its geometric features. Relatively small fasteners having non-complicated geometries can be made using a cold forming process. Conversely, relatively large fasteners having complicated geometries can be made using a hot forming process.

During the rolling process, the metal tube containing the sheathed, vibration-damping metal rope is passed through one or more pairs of opposed rollers to reduce the tube diameter, and thus uniformly embed the sheathed metal rope into the tube material inside the tube. The rolling operation produces a compound metal rod that can now be used for making vibration-dampening metallic fasteners utilizing the heading and thread rolling operations which are the standard steps in the process to manufacture fasteners from a single metal wire or a rod.

For vibration-dampening fasteners made from composite or plastic, molding is the primary manufacturing process. The molding process also starts with wrapping a bundle of metal wires in a thin sheath of metal (or other material that has similar thermal expansion properties with the base material of a fastener) that fully encompasses all of the wires. Then, the sheathed, vibration-damping metal rope is cut into the pieces that can be placed as damping inserts in the fastener molds. To avoid exposure of the insert on the outside surfaces of the final part, the length of each piece cut from the sheathed metal rope is smaller than the total length of the final fastener. The damping insert axis is aligned with the axis of the produced fastener by locating and supporting the damping insert inside the mold with insert locators that extend from the sheath during the fastener molding operation.

To ensure the sufficient fastener strength as required for a specific usage, the rolling, forming or extruding process parameters can be optimized to achieve the proper embedding of the cables into the fastener body where the cables are locked firmly into the base metal with the metal material flown over the cable outer surfaces (without infiltrating in between the individual wires). The improvement of bonding quality between the cable outer surfaces and the base material can be achieved by using sheathing with perforations that would allow limited direct contact of the base material with the outer surfaces of the cables for mechanical inter-locking between the base material and the sheathed cable surfaces.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

Figure 1:
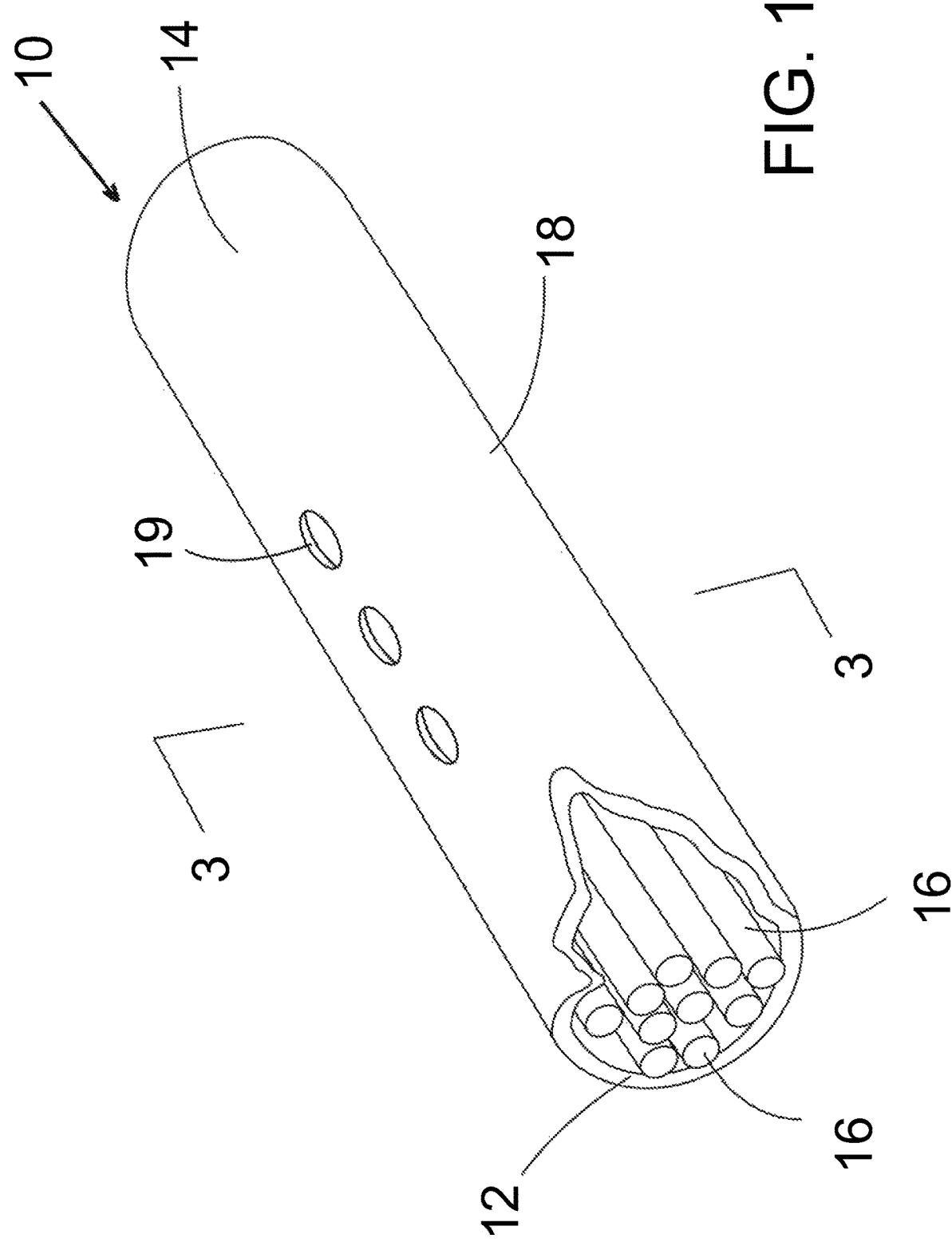
FIG. 1 is a perspective view of linear cables wrapped in a thin metal layer to form a sheathed, vibration-damping metal cable or rope according to one embodiment of a sheathed, vibration-damping metal rope incorporated into a fastener according to the disclosed inventive concept.

In the following figures, the same reference numerals will be used to refer to the same components. In the following description, various operating parameters and components are described for different constructed embodiments. These specific parameters and components are included as examples and are not meant to be limiting.

It is understood that the traditional way of improving vibration resistance of a fastened joint is to transfer the joint clamping force to the connected parts via stacked non-flat washers that can either offer increased grip capacity (e.g., Nord-Lock washers having interlocking features on their working surfaces) or the dissipation of vibration energy due to friction between their surfaces (e.g., Belleville washers that can be loaded along their axis). Unfortunately, the use of additional fastener components for adding damping into the joint structure is not always feasible when there are constraints on fastener dimensions, location and spacing. Thus, it is highly desirable to increase the damping capacity of the fastener itself without the need to adjust its overall shape or dimensions.

The disclosed inventive concept overcomes the limitations of the prior art by using bundles of woven wires (wire ropes or cables) embedded into the base fastener material by molding, rolling, forming or extruding. The embedded vibration-damping rope allows the utilization of dry friction between the individual wires of without any risk of compromised structural integrity of the resulting fastener since the ropes are locked firmly into the base material with the base material flown over the cable outer surfaces but without infiltration between the individual wires.

Figure 2:
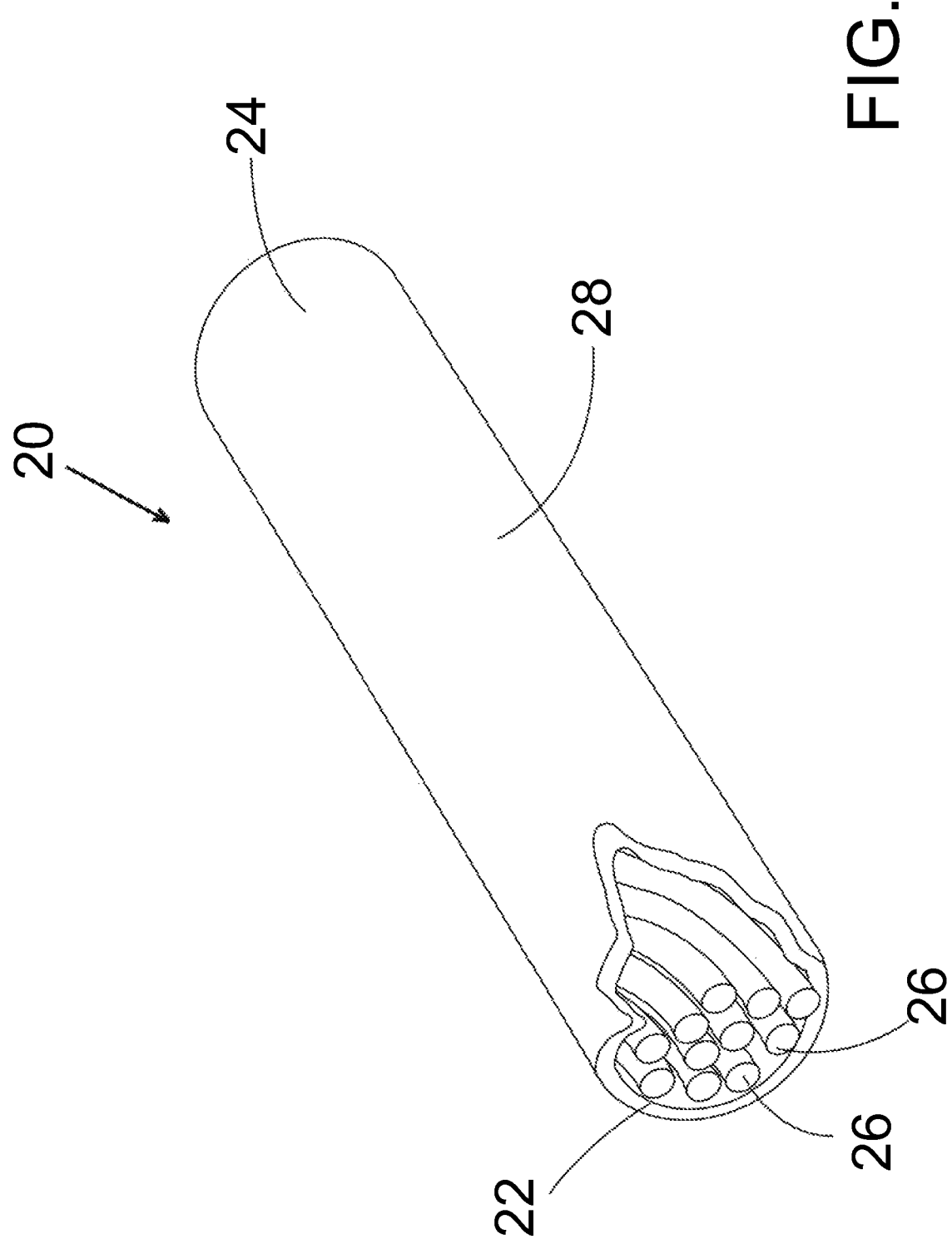
FIG. 2 is a perspective view of twisted cables wrapped in a thin metal layer to form a vibration-damping rope according to another embodiment of a sheathed, vibration-damping metal rope incorporated into a fastener according the disclosed inventive concept.
Figure 3:
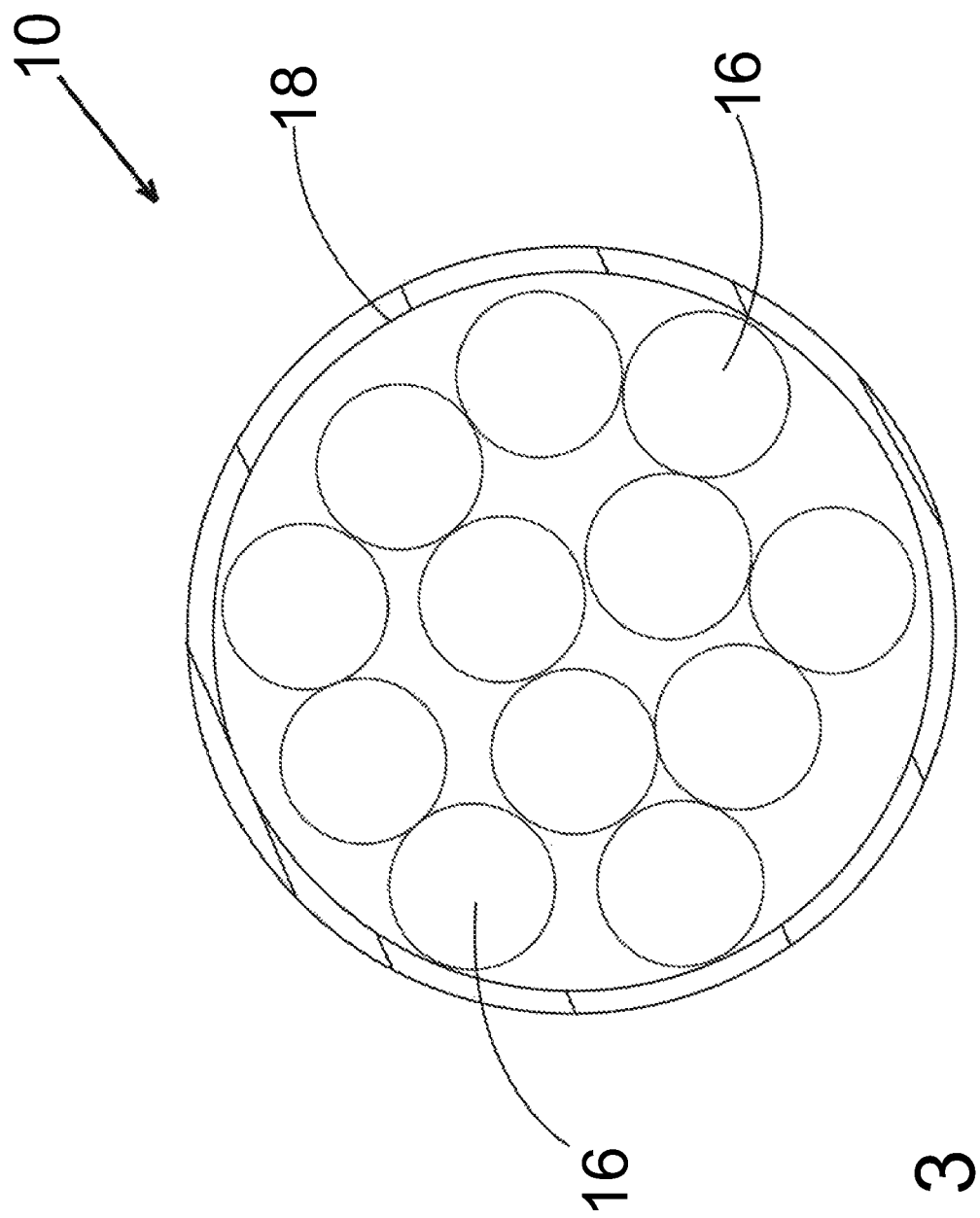
FIG. 3 is a cross-sectional view of the sheathed, vibration-damping metal rope taken along line 3-3 of FIG. 1.
Figure 4:
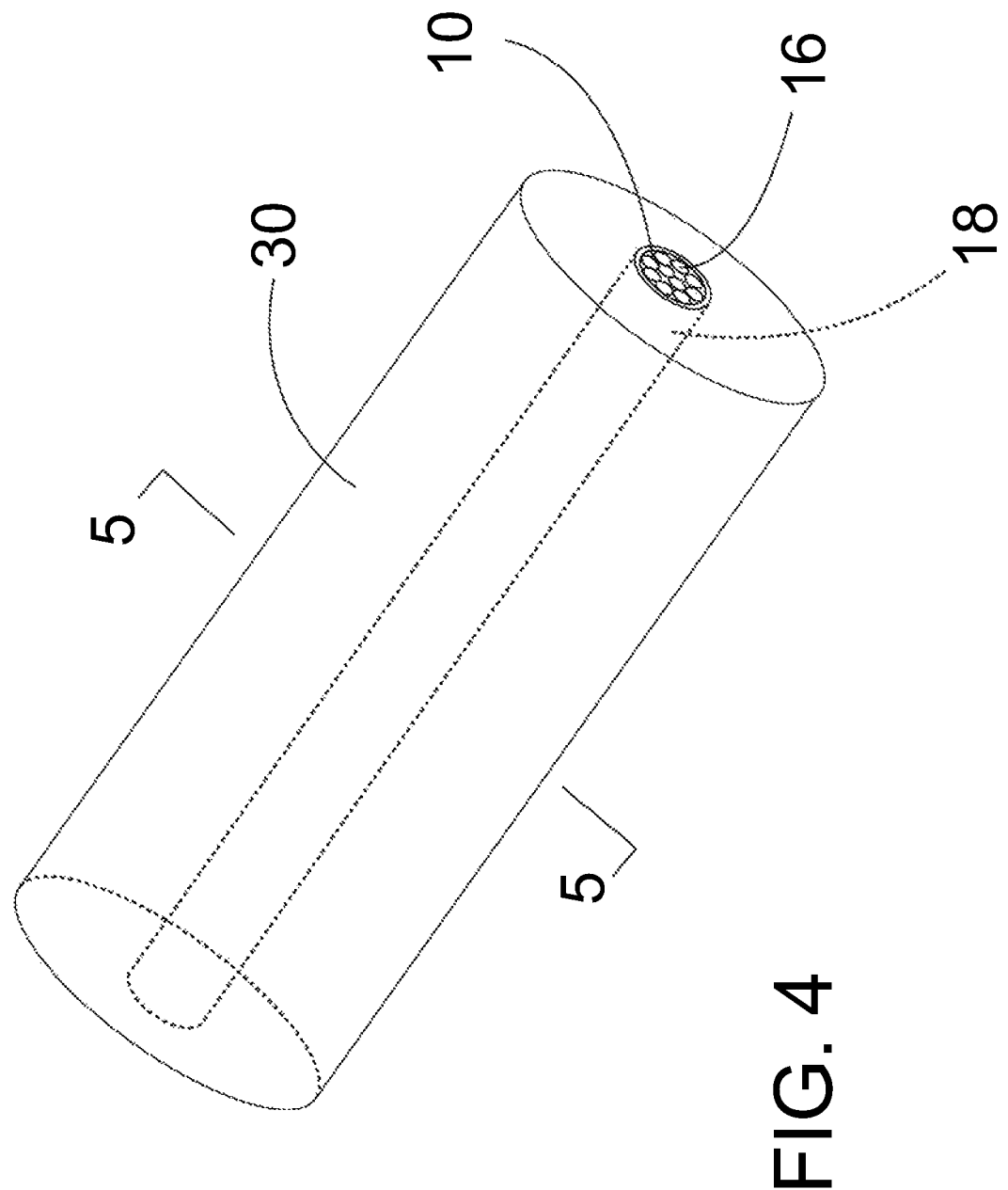
FIG. 4 is a perspective view of the sheathed, vibration-damping metal rope inserted into a metal tube for use in a fastener according to the disclosed inventive concept.
Figure 5:
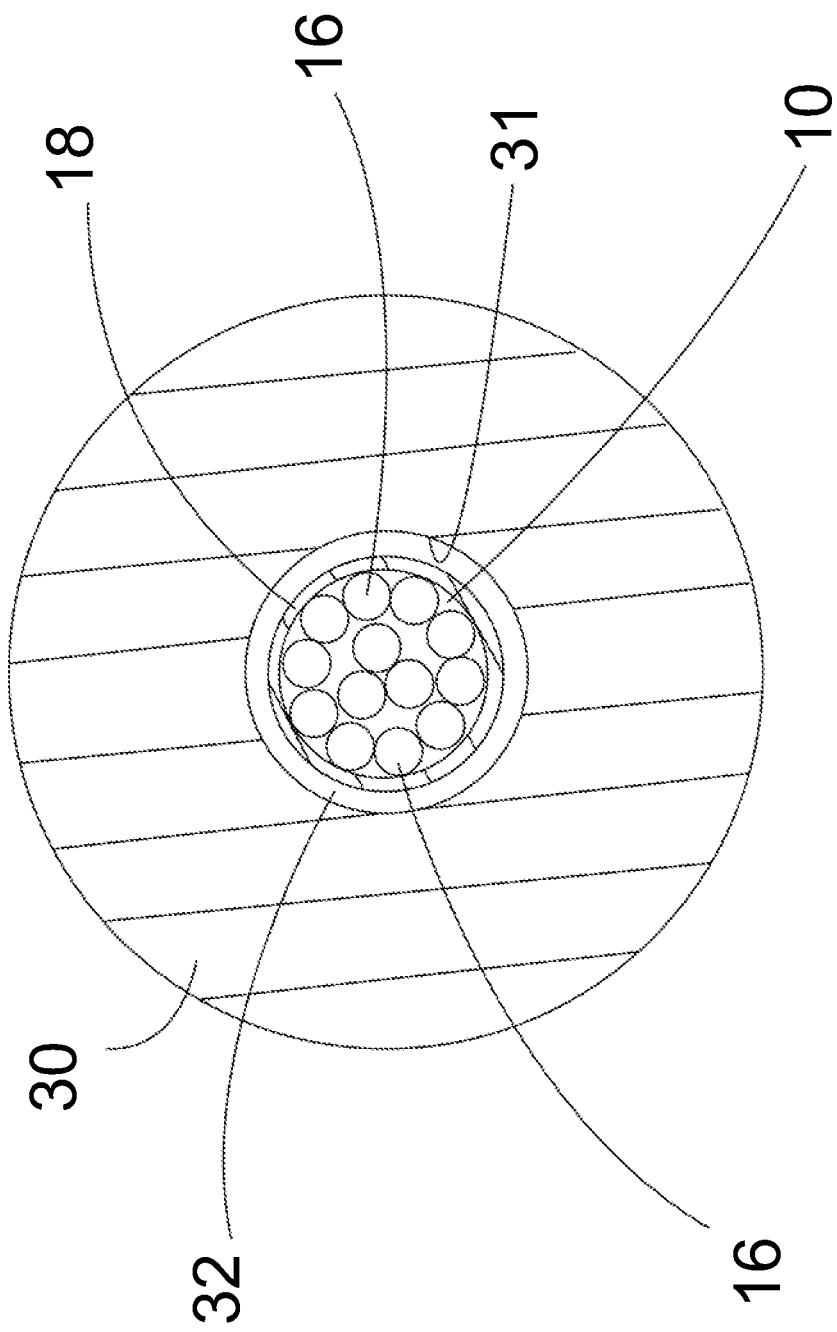
FIG. 5 is a cross-sectional view of the sheathed, vibration-damping metal rope within the metal tube taken along line 5-5 of FIG. 4.
Figure 10:
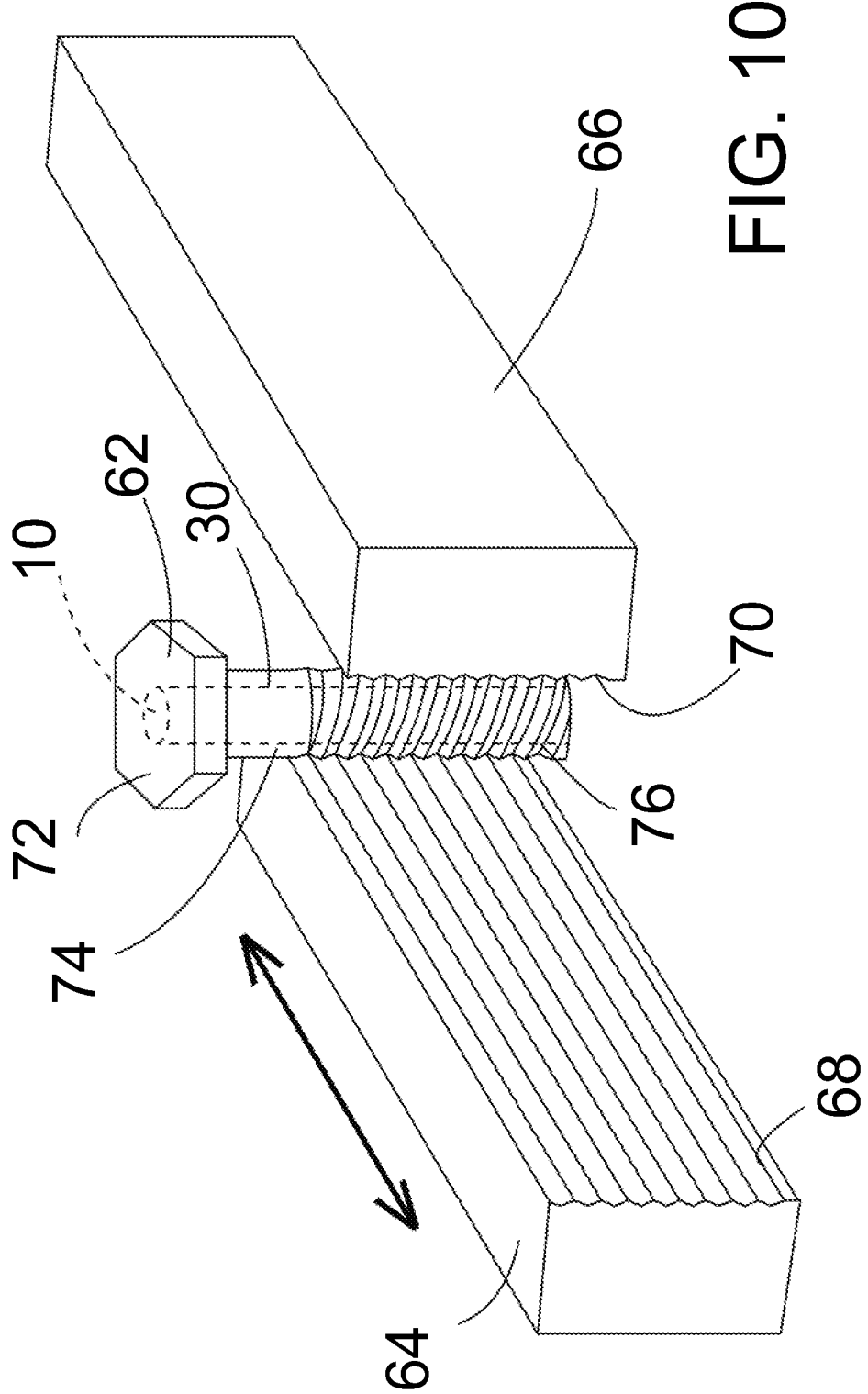
FIG. 10 is a perspective view of the shaped metal tube having the internal sheathed, vibration-damping metal rope of FIG. 9 being subjected to roll threading between two roll threading tools.
Figure 11:
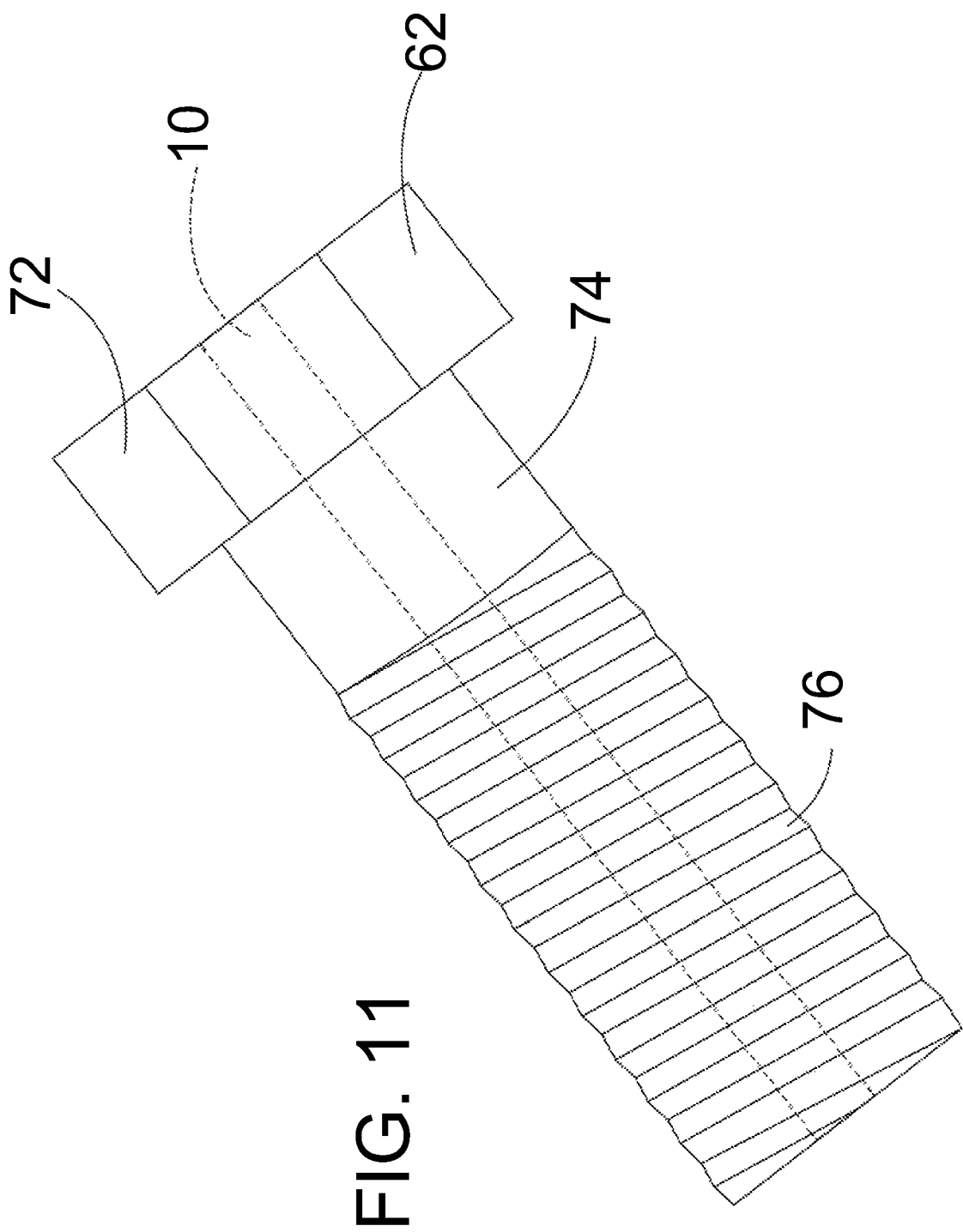
FIG. 11 is a fastener in the form of a bolt having the sheathed, vibration-damping metal rope axially embedded therein.
Figure 12:
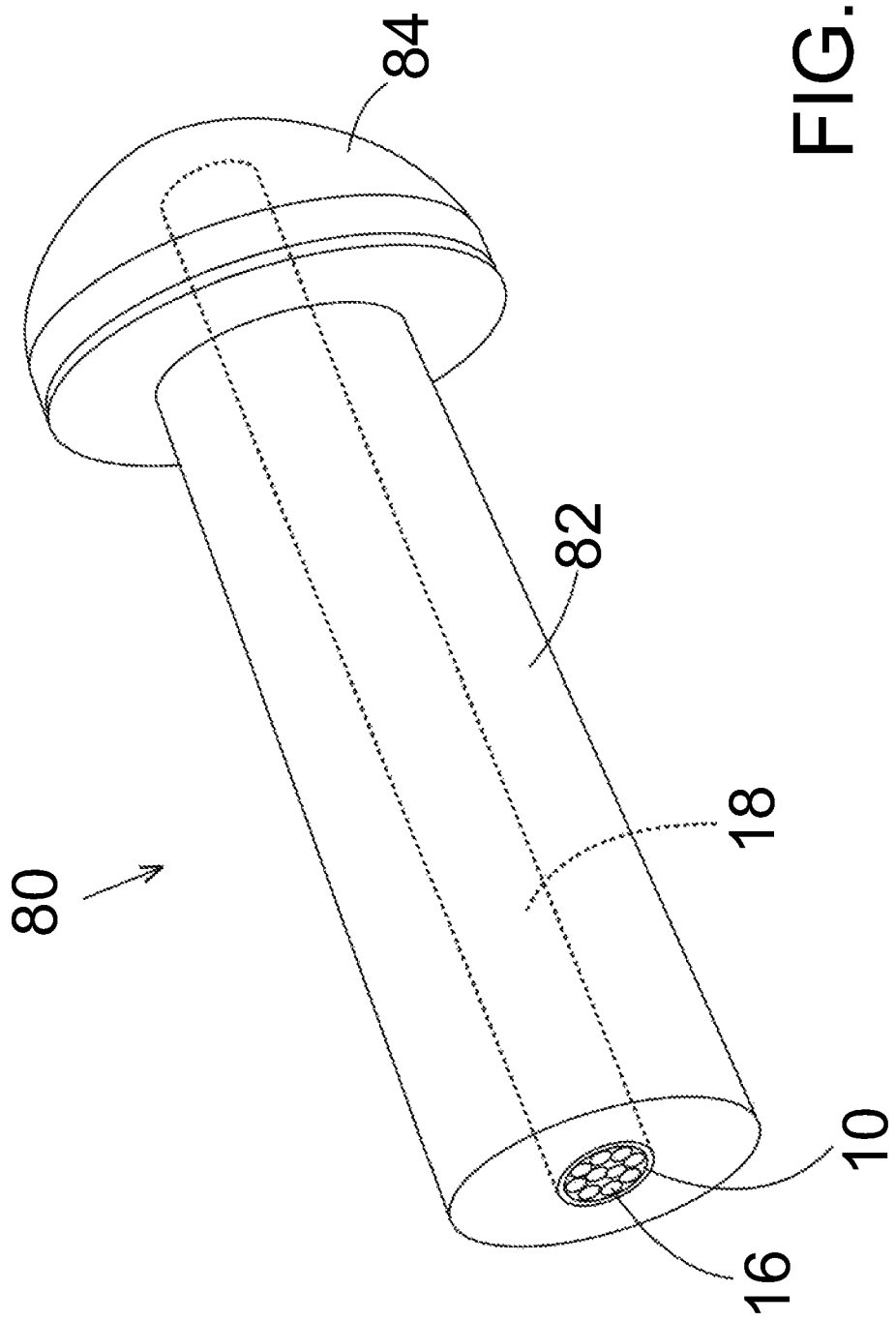
FIG. 12 is a fastener in the form of a rivet having the sheathed, vibration-damping metal rope axially embedded therein.
Figure 13:
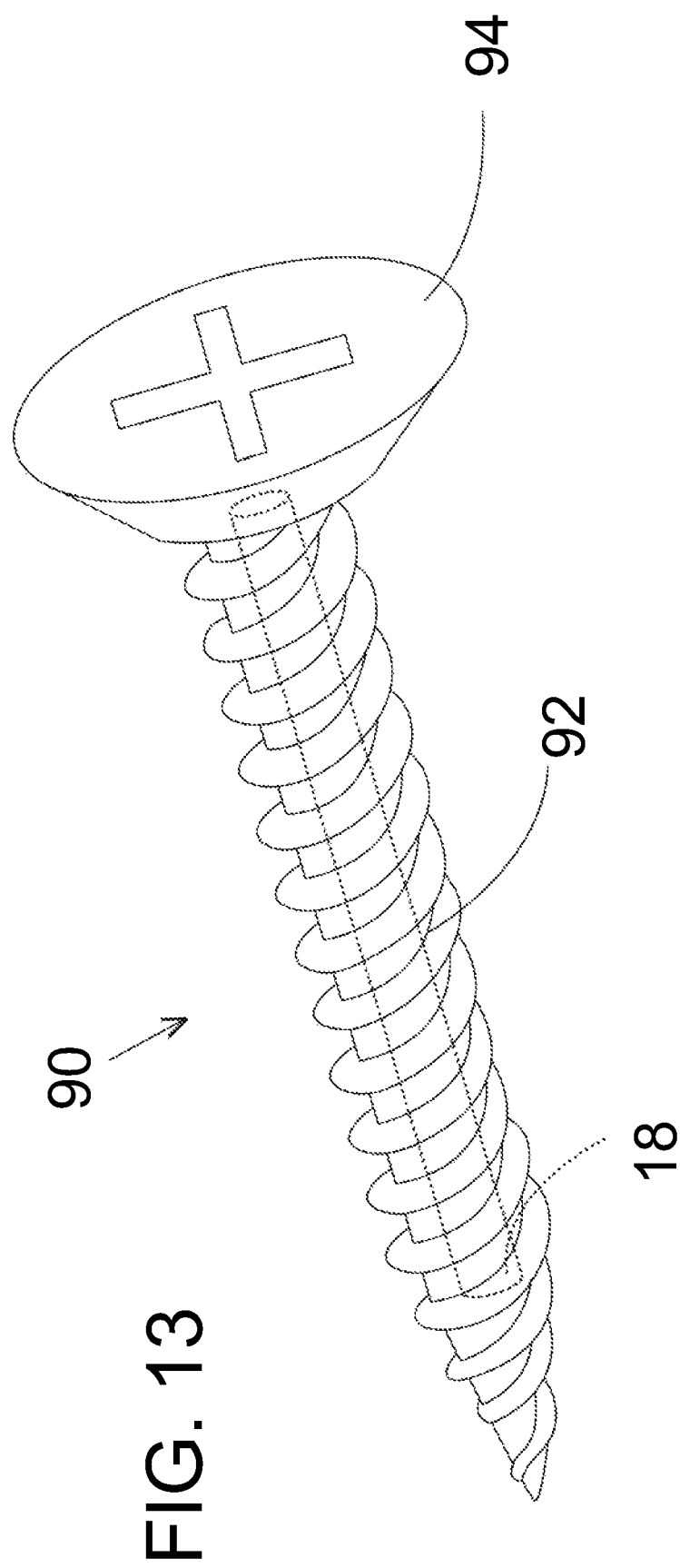
FIG. 13 is a fastener in the form of a screw having the sheathed, vibration-damping metal rope axially embedded therein.
Figure 14:
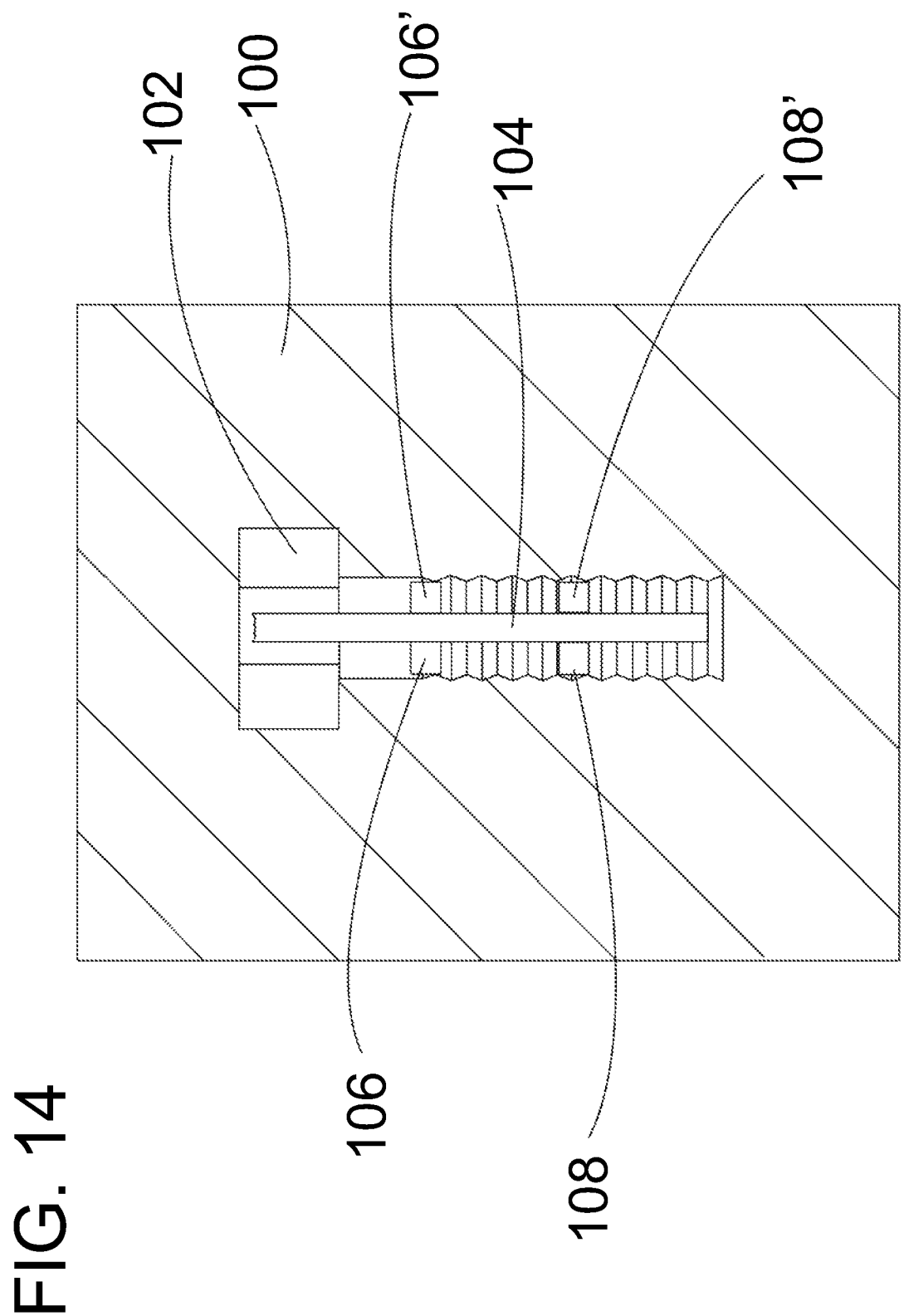
FIG. 14 is a plan view of a mold half having a cavity for the formation of a molded fastener, the cavity having a sheathed, vibration-damping metal rope with insert locators disposed therein in preparation for molding.

The accompanying figures and the associated description illustrate the construction and use of vibration-damping ropes according to the disclosed inventive concept. Particularly, FIGS. 1, 2 and 3 illustrate the sheathed, vibration-damping metal rope itself. FIGS. 4 and 5 illustrate the sheathed metal cable positioned in a thick-walled metal tube for later formation into a fastener. FIGS. 6 through 10 illustrate the formation of a fastener from the metal tube containing the sheathed, vibration-damping metal rope. FIGS. 11 through 13 illustrate various fasteners incorporating the sheathed, vibration-damping metal rope of the disclosed inventive concept. FIG. 14 illustrates a method of forming a composite or polymerized fastener that incorporates the sheathed, vibration-damping metal rope of the disclosed inventive concept.

Referring to FIGS. 1, 2 and 3, a sheathed, vibration-damping metal rope is shown. FIGS. 1 and 2 illustrate the sheathed, vibration-damping metal rope in a perspective, partially sectional view according to two embodiments of the disclosed inventive concept. FIG. 3 illustrates the sheathed, vibration-damping metal rope in a sectional view taken along line 3-3 of FIG. 1.

The length and diameter of the sheathed, vibration-damping metal rope shown in FIGS. 1, 2 and 3 as well as in other figures are only suggestive and are not intended as being limiting. Similarly, the number, diameter, and internal configuration of the cables (such as, but not limited to, a linear or helical arrangement) as illustrated are also only suggestive. A greater or lesser number of cables may be incorporated. By adjusting the length and diameter of the individual sheathed, vibration-damping metal ropes and by adjusting the number, diameter, and internal configuration of the cables, the sheathed, vibration-damping metal rope according to the disclosed inventive concept may be virtually infinitely tuned for a broad variety of applications.

Referring to FIG. 1, a sheathed, vibration-damping metal rope, generally illustrated as 10, includes a first end 12 and a second end 14 according to one embodiment of the disclosed inventive concept. The sheathed, vibration-damping metal rope 10 includes a plurality of wires 16 wrapped or otherwise encased in a metal sheathing 18. According to this embodiment, the wires 16 are provided in a linear arrangement as illustrated in FIG. 1.

Optionally formed in and through the metal sheathing 18 are one or more perforations 19. The perforations 19 allow limited direct contact of the base material with the outer surfaces of certain ones of the wires 16. This arrangement provides mechanical inter-locking between the base material and the surfaces of at least some of the wires 16.

Referring to FIG. 2, a vibration-damping rope, generally illustrated as 20, includes a first end 22 and a second end 24 according to another embodiment of the disclosed inventive concept. The vibration-damping rope 20 includes a plurality of wires 26 wrapped or otherwise encased in a metal sheathing 28. According to this embodiment, the wires 26 are twisted in a helical fashion as illustrated in FIG. 2.

A sectional view of the sheathed, vibration-damping metal rope 10 taken along line 3-3 of FIG. 1 is illustrated in FIG. 3. The illustrated thickness of the metal sheathing 18 and the number, diameter and spacing of the wires 16 are suggestive only and are not intended as being limiting. Each of these variables may be adjusted as desired for proper tuning of the resulting fastener.

After the sheathed, vibration-damping metal rope 10 is formed, it is cut to a desired length for the specific application. The cut piece of rope 10 is then positioned inside of a long, thick-walled metal tube 30 as illustrated in FIG. 4, which is a perspective view of the metal tube 30 having the cut rope 10 placed therein and FIG. 5, which is a sectional view of the metal tube 30 and cut rope 10 of FIG. 4. The thickness of the metal tube 30 is selected based upon the fastener to be formed. The metal tube 30 includes an axially formed shaft 31 having a diameter that is large enough to allow for the unconstrained insertion of the metal rope 10 as illustrated by the space 32 between the outer surface of the metal sheathing 18 and the wall of the axially formed shaft 31. A greater or lesser space 32 may be provided.

Figure 6:
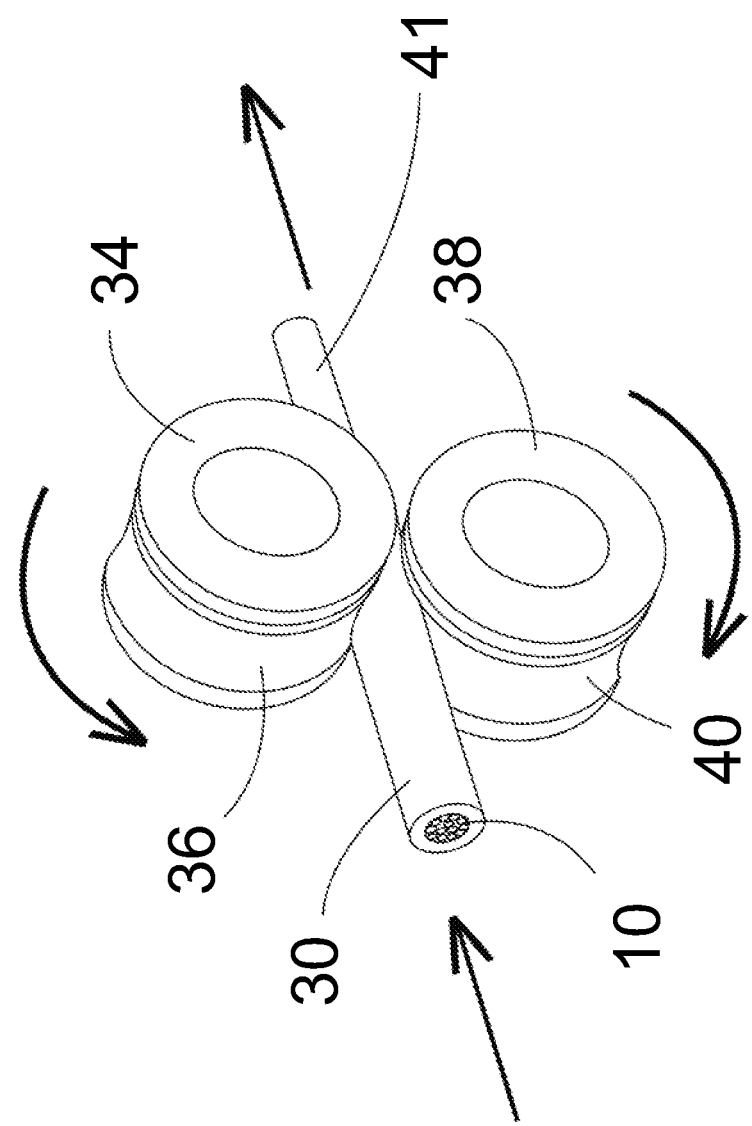
FIG. 6 is a perspective view of the metal tube having the internal sheathed, vibration-damping metal rope being rolled between a pair of opposed rollers.

With the sheathed, vibration-damping metal rope 10 inserted within the thick-walled metal tube 30, the desired fastener is able to be formed. The first step of fastener formation is to roll the metal tube 30 containing the metal rope 10 so as to uniformly embed the sheathed, vibration-damping metal rope 10 into the of the axially formed shaft 31 of the metal tube 30. While it is possible to use other methods, this step is preferably achieved by passing the metal tube 30 containing the metal rope 10 between one or more pairs of rollers as illustrated in FIG. 6. With reference thereto, a first roller 34 having a peripheral, tube passing channel 36 is positioned adjacent a second roller 38 having a peripheral, tube passing channel 40. The rolling operation illustrated in FIG. 6 produces a compound metal rod 41 that can now be used in making vibration-damping metallic fasteners.

The next step in making the body of the fastener from the compound metal rod 41 depends on its size (overall length and diameter) and geometry features. Relatively small fasteners (those having diameters smaller than M27 and lengths of less than 300 mm) of non-complicated geometries can be made using a cold forming process. Cold forming is used to make the majority of fasteners today as the process is able to realize a relatively high product output. For the manufacture of fasteners having relatively large diameters (starting with approximately M27, and longer pieces starting with approximately 300 mm), hot forming is used. While being more costly, hot forming is desirable for relatively low production runs of fasteners with large diameters and lengths and having relatively complicated geometries.

Figure 7:
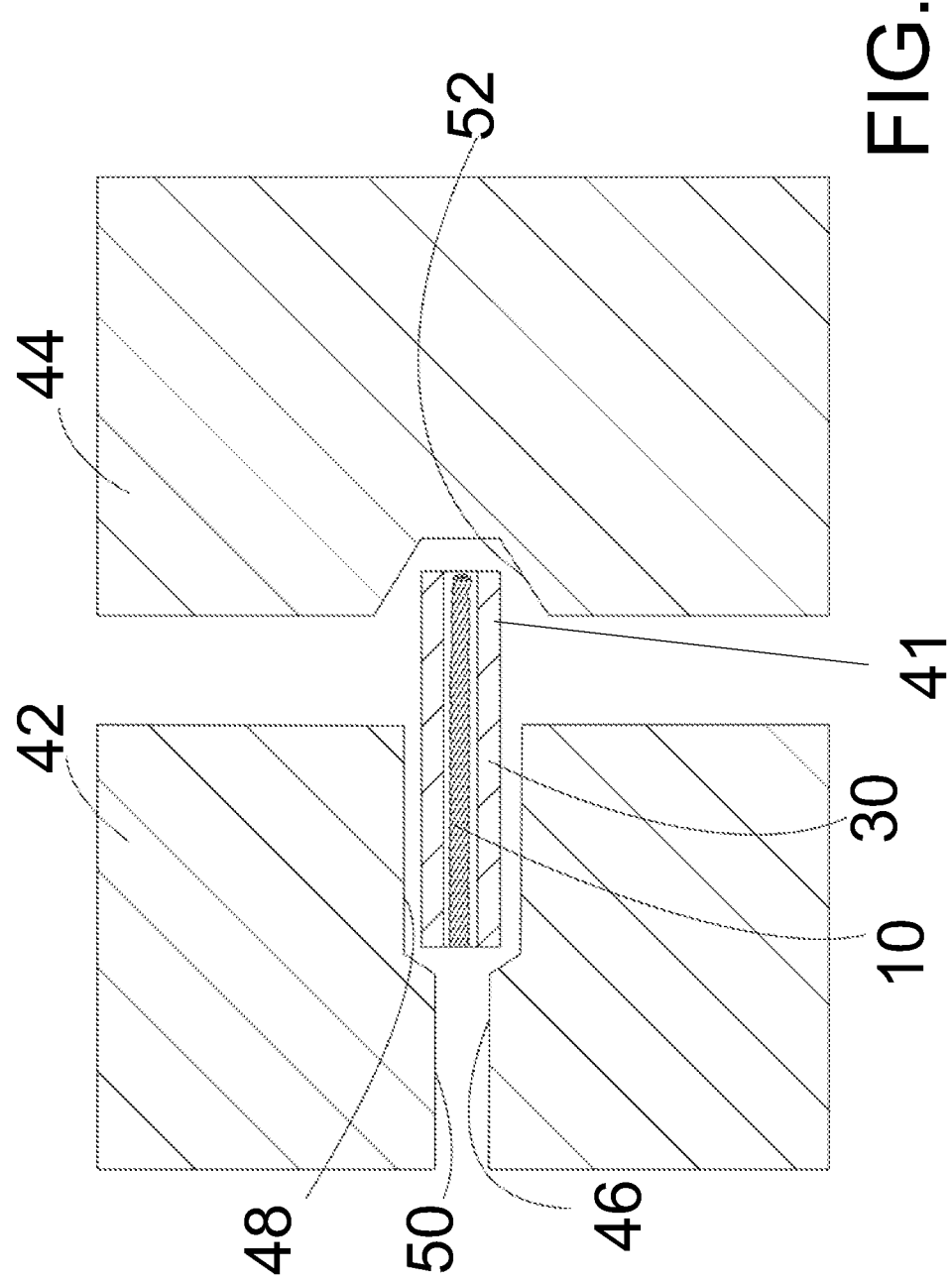
FIG. 7 is a sectional view of the metal tube having the internal sheathed, vibration-damping metal rope being subjected to first shaping step within a first set of dies.
Figure 8:
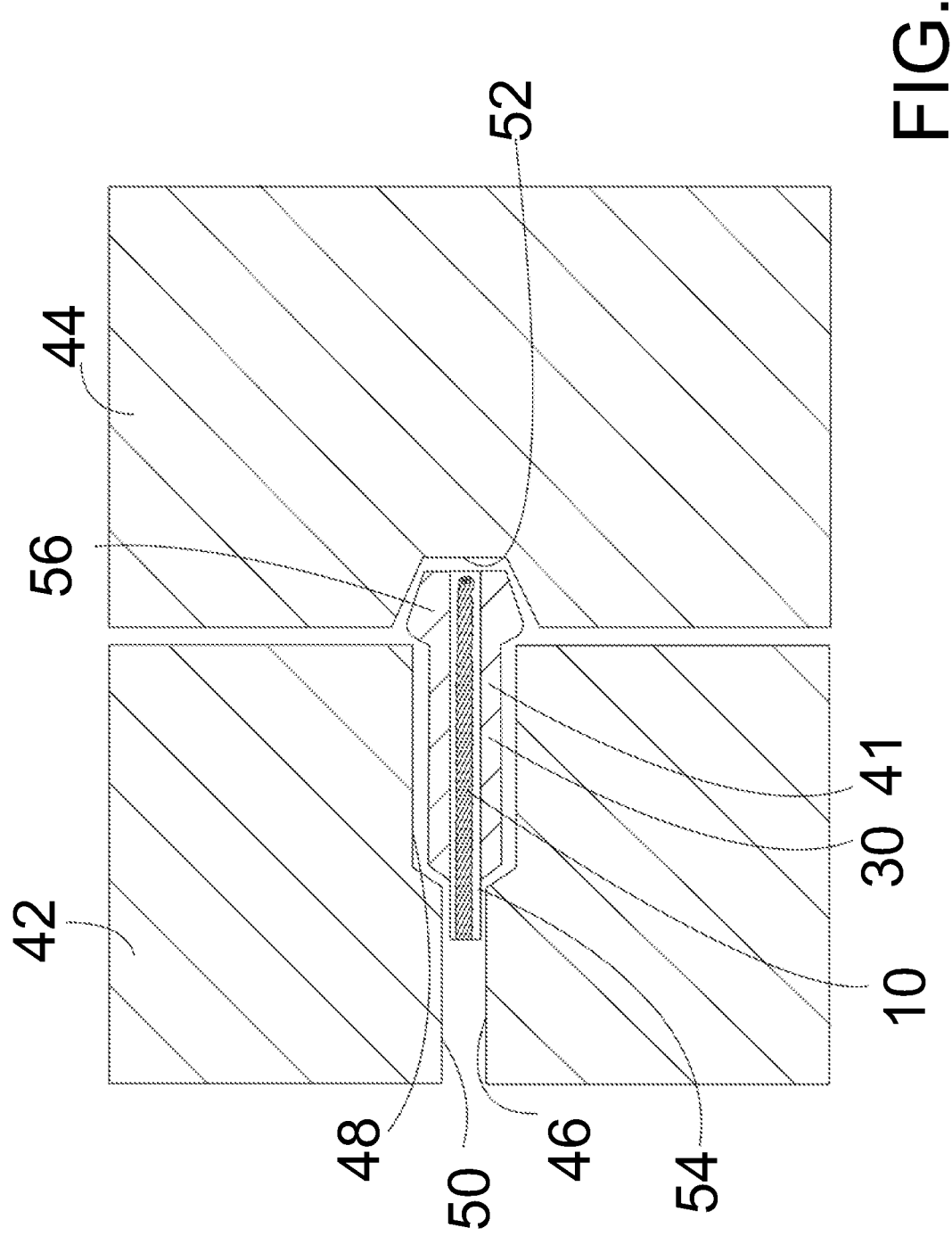
FIG. 8 is a sectional view of the metal tube having the sheathed, vibration-damping metal rope being subjected to second shaping step within the first set of dies of FIG. 7.
Figure 9:
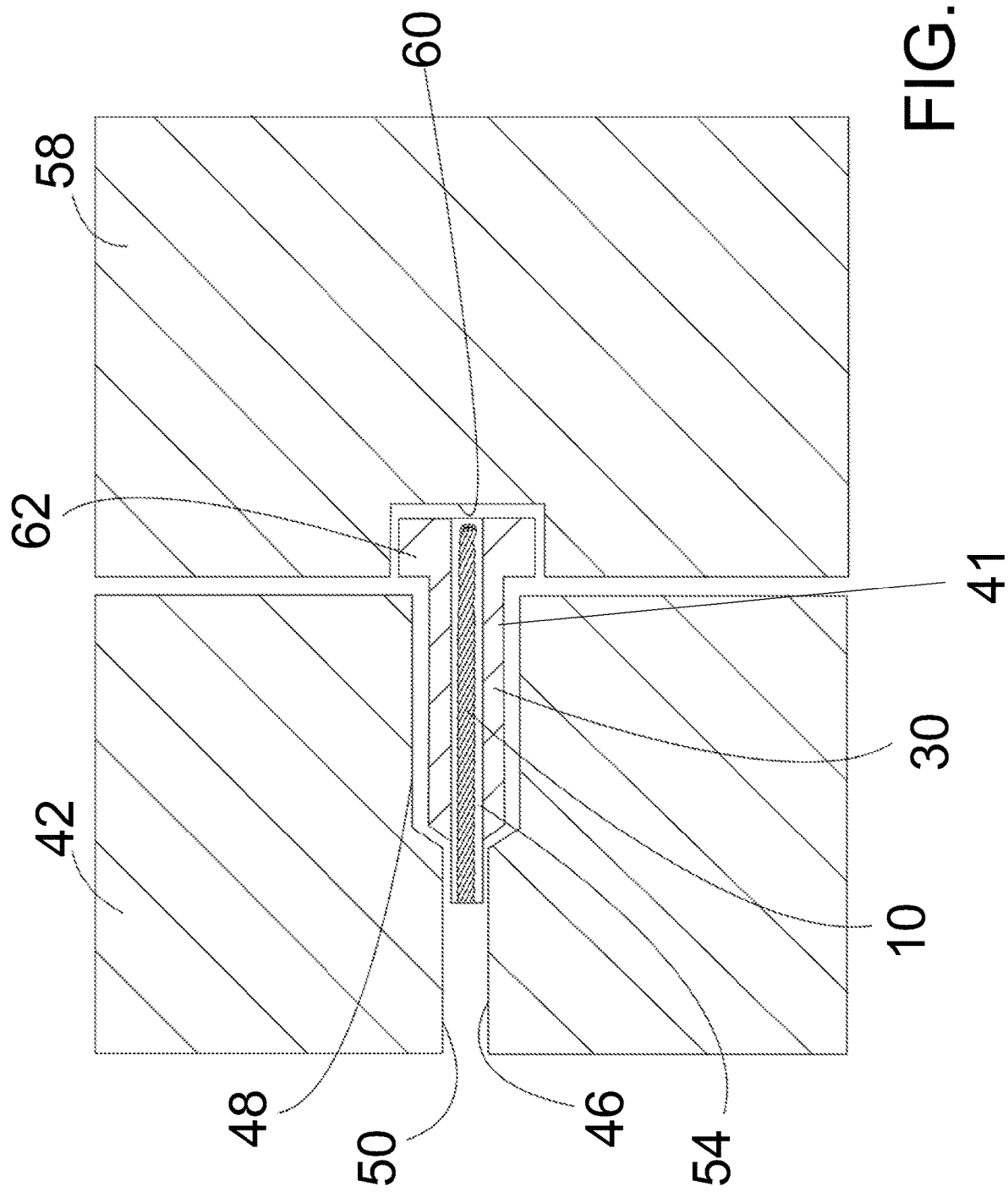
FIG. 9 is a sectional view of the metal tube having the internal sheathed, vibration-damping metal rope being subjected to a third shaping step within a second set of dies.

Referring to FIGS. 7 through 9, a method of producing a fastener blank from the compound metal rod 41 formed in the rolling process of FIG. 6 and described in relation thereto is shown. It is to be understood that the method illustrated in FIGS. 7 through 9 is suggestive only as other methods of forming the finished fastener having the sheathed, vibration-damping metal rope 10 as its core are possible.

In FIG. 7, a first die 42 and a second die 44 are positioned opposite one another. The first die 42 has an elongated channel 46 formed therein for receiving the compound metal rod 41. The elongated channel 46 preferably though not absolutely includes a wide portion 48 and a narrow portion 50. The compound metal rod 41 is initially positioned in the wide portion 48 of the elongated channel 46. The second die 44 has a recessed area 52 formed on its inner surface.

If hot forging is the method of choice for forming the fastener having the sheathed, vibration-damping metal rope 10 as its core, the compound metal rod 41 is first wholly or partially heated to an appropriate temperature for forging. The step of heating the compound metal rod 41 enables even complicated geometries or very high degrees of forming to be realized.

As illustrated in FIG. 8, once the compound metal rod 41 is positioned in the elongated channel 46, movement of one or both of the dies 42 and 44 may cause the formation of a narrowed tail 54 on one end of the compound metal rod 41 and a head 56 to be formed on the other end of the compound metal rod 41. The narrowed tail 54, if formed, is preferably removed as a later step of the fastener-forming operation.

After the head 56 is formed on the compound metal rod 41, preferably but not absolutely a heading die such as a heading die 58 shown in FIG. 9 replaces the second die 44 to complete the fastener forming operation. In this instance, and for illustrative purposes only, the heading die 58 has a hex head-forming recessed area 60. The heading die 58 is used to form a fastener head, such as a screw head or a square or hex head for a bolt, by heading or upset forging.

As illustrated in FIG. 9, a hex head 62 has been formed on the tool attachment end of the compound metal rod 41.

For some fasteners having the embedded sheathed, vibration-damping metal rope 10, such as rivets, no further forming operation is required. However, for some fasteners, such as bolts, an additional step of forming threads is required. The threads may be formed by one of several methods, including cutting. One preferred method of forming the threads in a bolt blank is illustrated in FIG. 10 in which the now-forged compound metal rod 41 is positioned between two thread forming blocks 64 and 66, of which at least one (in this instance, block 64) is reciprocatingly movable. The thread forming block 64 includes a series of threads 68 formed on its inner surface. The thread forming block 66 includes a series of threads 70 formed on its inner surface. By moving one or both of the thread forming blocks 65 and 66 in a reciprocating manner, a fastener having a shank 74 and a threaded portion 76 is formed. The sheathed, vibration-damping metal rope 10 is embedded therein.

A great variety of vibration-damped fasteners may be formed according to the disclosed inventive concept. Non-limiting examples of such fasteners include bolts, such as hex bolts, lag bolts, and carriage bolts, and screws, such as wood screws, sheet metal screws, machine screws, and socket screws. Other fasteners that can be formed according to the disclosed inventive concept include rivets, clips (such as circlips and hairpin clips), and pins (such as cotter, split, and clevis pins).

Examples of fasteners according to the disclosed inventive concept are illustrated in FIGS. 11 through 13. With specific reference to FIG. 11, the bolt fastener 72 finally formed in the step of FIG. 10 includes a shank 74, a threaded portion 76 and the hex head 62. With reference to FIG. 12, a rivet fastener 80 includes an unthreaded shank 82 and a head 84. With reference to FIG. 13, a screw fastener includes a threaded portion 92 and a fastener head 94. The sheathed, vibration-damping metal rope 10 is embedded in each of the bolt fastener 72, the rivet fastener 80, and the screw fastener 90.

While metal fasteners discussed above are extremely common and find application in a broad variety of industries, composite and plastic fasteners are experiencing increased utilization as weight-to-strength ratios improve based on technical advancements in polymer science. In view of the increased desirability of forming fasteners from composite material (such as carbon-reinforced plastic), it is to be understood that the advantages achieved in metal fasteners by use of the sheathed, vibration-damping metal rope of the disclosed inventive concept may be shared by non-metallic fasteners employing the same embedded metal rope technology.

FIG. 14 illustrates the molding of a non-metallic fastener having an embedded sheathed, vibration-damping metal rope. With reference to FIG. 14, a mold half 100 having a part cavity 102 formed therein is illustrated. The part cavity 102 defines a bolt fastener, but it is to be understood that any fastener may be produced according to the mold procedure described herein.

A cut sheathed, vibration-damping metal rope 104 is positioned within the part cavity 102. The sheathed, vibration-damping metal rope 104 includes one or more insert locators to properly position the metal rope 104 within the part cavity 102 before and during the casting operation. Particularly, the sheathed, vibration-damping metal rope 104 includes a first pair of opposed insert locators 106 and 106' and a second pair of opposed insert locators 108 and 108'. The insert locators 106, 106', 108, and 108' are integrally formed with the sheath of the sheathed, vibration-damping metal rope 104. The insert locators 106, 106', 108, and 108' are positioned such that they do not extend to the edge of the part cavity 102 and thus do not extend out of the part formed therein. The number and placement of the insert locators may vary from the number and placement illustrated in FIG. 14.

One skilled in the art will readily recognize from such discussion, and from the accompanying drawings and claims that various changes, modifications and variations can be made therein without departing from the true spirit and fair scope of the invention as defined by the following claims.

What is claimed is:

1. A vibration-damping fastener comprising:
    a body having a first end, a second end and a long axis; and
    a vibration-damping metal rope embedded in said body along said axis between said first and second ends, said rope comprising a plurality of wires positioned next to one another and a metal sheathing encasing said plurality of wires, wherein the plurality of wires are not bonded to one another so as to allow for sliding movement of the surfaces of the wires relative to one another for damping resonant vibration of the fastener.

2. The vibration-damping fastener of claim 1, wherein said first end is a head portion and said second end is a fastening portion.

3. The vibration-damping fastener of claim 2, wherein said fastening portion is threaded.

4. The vibration-damping fastener of claim 1, wherein said metal sheathing includes at least one material-passing perforation.

5. The vibration-damping fastener of claim 1, further including at least one insert locator extending from said metal sheathing.

6. The vibration-damping fastener of claim 5, wherein elongated fastening portion has an outer surface and wherein said at least one insert locator has a first end attached to said metal sheathing and a second end opposite said first end, said second end being internal to but not in contact with said outer surface.

7. The vibration-damping fastener of claim 1, wherein said wires are arranged linearly or helically.

8. The vibration-damping fastener of claim 1, wherein said head portion and said elongated fastening portion are formed from a metal or a polymerized material.

9. A vibration-damping fastener comprising:
    a head portion; an elongated fastening portion extending from said head portion; and
    a vibration-damping metal rope embedded in at least said elongated portion, said rope having first and second ends, said rope comprising a plurality of wires positioned next to one another and a metal sheathing encasing said wires, wherein the plurality of wires are not bonded to one another so as to allow for sliding movement of the surfaces of the wires relative to one another for damping resonant vibration of the fastener.

10. The vibration-damping fastener of claim 9, wherein said elongated fastening portion is threaded.

11. The vibration-damping fastener of claim 9, wherein said metal sheathing includes at least one material-passing perforation formed therethrough.

12. The vibration-damping fastener of claim 9, further including at least one insert locator extending from said metal sheathing.

13. The vibration-damping fastener of claim 12, wherein elongated fastening portion has an outer surface and wherein said at least one insert locator has a first end attached to said metal sheathing and a second end opposite said first end, said second end being internal to but not in contact with said outer surface.

14. The vibration-damping fastener of claim 9, wherein said wires are arranged linearly.

15. The vibration-damping fastener of claim 9, wherein said wires are arranged helically.

16. The vibration-damping fastener of claim 9, wherein said head portion and said elongated fastening portion are formed from a metal or a polymerized material.

17. A method for forming a metal vibration-damping faster, the method comprising:
   forming a vibration-dampening rope by bundling a plurality of wires positioned next to one another and encasing said bundled wires in a metal sheathing, said wires being arranged linearly or helically with respect to one another;
   forming an elongated metal tube having an axial shaft;
   inserting said rope into said shaft;
   rolling said metal tube containing said rope between rollers; and
   forming said rolled metal tube containing said rope into the vibration-damped fastener,
   wherein the plurality of wires are not bonded to one another so as to allow for sliding movement of the surfaces of the wires relative to one another for damping resonant vibration of the fastener.

18. The method for forming a metal vibration-damping fastener of claim 17, wherein said forming step includes forming said rolled metal tube containing said rope into the vibration-damping fastener using dies.

19. The method for forming a metal vibration-damping fastener of claim 18, including the step of heating said rolled metal tube containing said rope before being subjected to forming using said dies.

20. The method for forming a metal vibration-damping fastener of claim 17, wherein said axial shaft has a diameter sufficient to allow for the unrestricted insertion of said rope into said shaft during the step of inserting said rope into said shaft.

* * * * *